(12) United States Patent
Cormier et al.

(10) Patent No.: US 7,384,095 B2
(45) Date of Patent: Jun. 10, 2008

(54) PROCESS FOR IN-MOLDING AN ENERGY-ABSORBING COUNTERMEASURE TO A HEADLINER AND RESULTING ASSEMBLY

(75) Inventors: Joel Matthew Cormier, Ferndale, MI (US); Donald Scott Smith, Commerce Township, MI (US)

(73) Assignee: Oakwood Energy Management, Inc., Dearborn, MI (US)

( * ) Notice: Subject to any disclaimer, the term of this patent is extended or adjusted under 35 U.S.C. 154(b) by 199 days.

(21) Appl. No.: 11/044,573

(22) Filed: Jan. 27, 2005

(65) Prior Publication Data

US 2005/0127718 A1    Jun. 16, 2005

(51) Int. Cl.
*B60R 21/02* (2006.01)
(52) U.S. Cl. .................................. 296/214; 296/187.05
(58) Field of Classification Search ................ 296/214, 296/210, 187.03, 178.05
See application file for complete search history.

(56) References Cited

U.S. PATENT DOCUMENTS

| 6,204,209 | B1 | 3/2001 | Rozek et al. |
| 6,231,072 | B1 | 5/2001 | Pywell et al. |
| 6,368,702 | B1 | 4/2002 | Erickson |
| 6,582,639 | B2 | 6/2003 | Nellis |
| 6,652,021 | B1 | 11/2003 | Dykman et al. |
| 6,779,835 | B2 | 8/2004 | Fox et al. |
| 6,832,810 | B2 | 12/2004 | Byma et al. |
| 2002/0013686 | A1 | 1/2002 | Bellora et al. |
| 2002/0190506 | A1 | 12/2002 | Tiesler |
| 2004/0178662 | A1 | 9/2004 | Carroll, III et al. |

*Primary Examiner*—Joseph D. Pape
(74) *Attorney, Agent, or Firm*—Brooks Kushman P.C.

(57) ABSTRACT

A process for in-molding an energy-absorbing countermeasure to a headliner 18 for use in a vehicle, plus the intermediate and final assemblies formed by the process. The process includes the steps of (1) preparing a sheet; (1A) optionally affixing to the sheet a means for adhering to form a composite sheet; (2) thermoforming the composite sheet into a composite energy-absorbing countermeasure; (3) preparing a headliner layup (including optionally a means for adhering, a headliner core, and a cover stock) before forming a bond between the headliner layup and the composite energy-absorbing countermeasure. The assembly thus includes the energy-absorbing countermeasure 22 and a means for adhering it to the headliner core 18.

6 Claims, 3 Drawing Sheets

(section A A)

PROCESS FOR IN-MOLDING AN ENERGY-ABSORBING COUNTERMEASURE TO A HEADLINER AND RESULTING ASSEMBLY

BACKGROUND OF THE INVENTION

1. Field of the Invention

The invention relates to protecting an occupant in a vehicle when the vehicle is on the giving or receiving end of an impact. More particularly, it relates to a method for in-molding an energy absorber to a headliner and the assembly created thereby.

2. Background Art

The National Highway Traffic Safety Administration's (NHTSA) Federal Motor Vehicle Safety Standard 201(FMVSS201), entitled "Occupant Protection in Interior Impact," spells out the criteria for upper interior impact protection of an occupant in a motor vehicle. NHTSA estimates that even with airbags, (1) the vehicle occupant's impact with the pillars, roof-side rails, windshield header and rear header results in many passenger car occupant fatalities; and (2) head impacts cause many moderate to critical (potentially fatal) passenger car occupant injuries. Manufacturers decide how to meet the requirements of FMVSS201. A popular method of compliance is the installation of energy-absorbing countermeasures such as padding, which manufacturers hope will reduce the number and severity of injuries.

Today's vehicles are equipped with a burgeoning array of devices. Some are installed for safety, such as airbags and energy absorbers. In most cases, the cost of material, manufacturing, and installation of all related components becomes a significant factor in overall manufacturing economics.

In some cases, one or more energy absorbers is or are glued to one side of a headliner. Gluing steps, however, take time, and entail material costs. Further, the area of contact between the headliner and energy absorber may be discontinuous if the glue is not applied uniformly to the entire underside of the energy absorber that is to be bonded with the headliner.

A search that preceded the filing of this application revealed the following U.S. references: U.S. Pat. Nos. 6,204,209 B1; 6,368,702 B1; 6,231,072 B1; 6,582,639 B2; 6,652,021 B1; 6,779,835 B2; 6,832,810 B2; 2002/0013686 A1; 2002/0190506 A1; and 2004/0178662 A1.

SUMMARY OF THE INVENTION

The invention has two overall aspects: a process for attaching an energy-absorbing countermeasure to a headliner for use in a vehicle; and the resulting assembly of an energy-absorbing countermeasure and a headliner.

Preferably, the process comprises the steps of:

(1) preparing a sheet (a strip of plastic, for example);

(1A) optionally, laminating to the sheet a means for adhering (e.g., a film, a spray coat, a co-extruded film or a roll-coated film) that has a lower melting temperature than the sheet to form a composite sheet;

(2) heating the composite sheet and thermoforming it into a composite energy-absorbing countermeasure; and (3) heating a headliner layup to an optimum temperature and generating a melt bond between the headliner layup and the composite energy-absorbing countermeasure. Optionally, the headliner layup includes a bonding promoter (such as another or the same means for adhering used in step (1A)), a headliner core, and a cover stock. No glue is needed.

It will be appreciated that several alternatives are available for the bonding materials or films, including: adhesive web, a melt bond adhesive, various polymers, heat activated catalysts, and the like.

The invention also includes the intermediate and final assembly of an energy-absorbing countermeasure—available in various forms e.g. a thermoformed or injection-mold plastic or foam, including expanded foam, EPP, PP and PU—and a headliner. Preferably, the final assembly comprises an energy-absorbing countermeasure formed from the sheet, including means (such as a base or tether) for coordinating energy absorbing units. One or more energy absorbing units (such as cup-shaped recesses) are associated with the means for coordinating. The coordinating means position the units in relation to each other before, during and after relative motion between an incident object and the energy-absorbing countermeasure.

At least some of the units have an intermediate wall before impact. The units cooperate to afford mutual support in decelerating an object that imparts the impacting force so that those forces are at least partially absorbed. Optionally, a first means for adhering adheres to at least a part of an underside of the energy-absorbing countermeasure. As used herein, the term "means for adhering" means any substance, inorganic or organic, natural or synthetic, that is capable of bonding the energy-absorbing countermeasure to the headliner layup together by surface attachment. Synthetic organic compounds include, for example, elastomer-solvent cements, polysulfide sealants, thermoplastic resins (for hot-melts) such as polyethylene, isobutylene, polyamides, polyvinyl acetates, and thermosetting resins, including epoxy, phenoformaldehyde, polyvinyl butyral, and cyanocrylates. Also exemplary of a means for adhering is the notion of hot-melt adhesion wherein a solid, thermoplastic material quickly melts upon heating, and then sets to a firm bond on cooling. This offers the possibility of almost instantaneous bonding. Typical ingredients of hot-melts are polyethylene, polyvinyl acetate, polyamides, and hydrocarbon resins. If desired, rubber-based adhesives may also be used. These include a solution of natural or synthetic rubber in a suitable organic solvent, a rubber latex, and silicone rubber cement.

Optionally, a second means for adhering which may or may not be equivalent to the first means for adhering, extends over at least part of a top surface of a headliner core. The headliner core is positioned so that it is initially separated from the underside of the energy-absorbing structure by the first and the second means for adhering until the means for adhering are juxtaposed. The second means for adhering becomes bonded to the first means for adhering when the means for adhering are heated and urged together. A headliner cover stock is affixed to at least a part of a second surface of the headliner core.

Alternative ways of practicing the present invention include applying an adhering means to the energy-absorbing countermeasure, or to the headliner layup, or to both.

DETAILED DESCRIPTION OF THE PREFERRED EMBODIMENT(S)

The Process

Figure 1A:
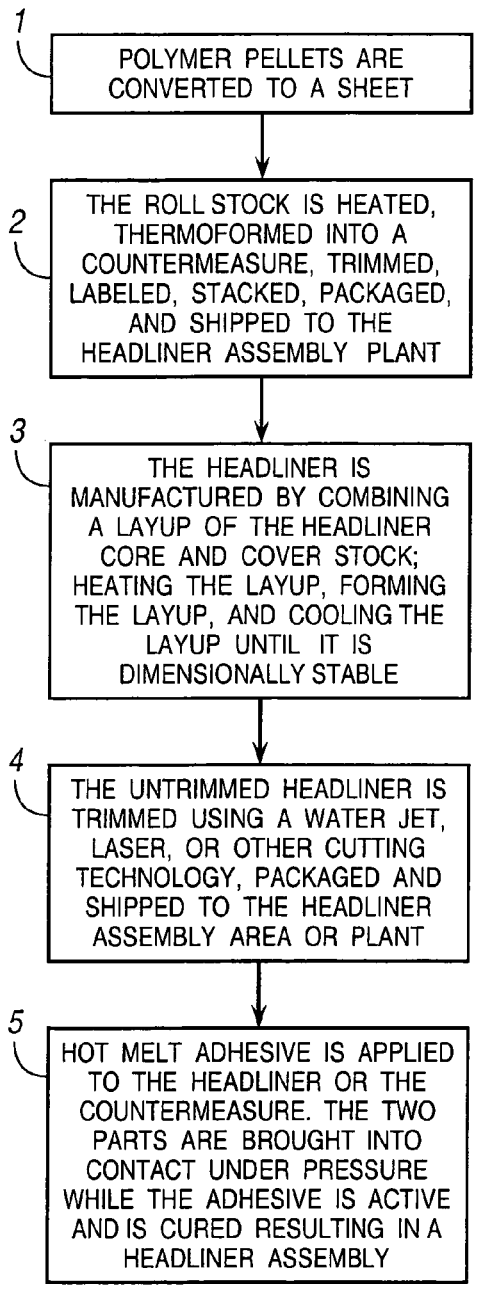
FIG. 1 is a side-by-side process flow diagram comparing current and proposed processes for attaching an energy-absorbing countermeasure to a headliner.
Figure 1B:
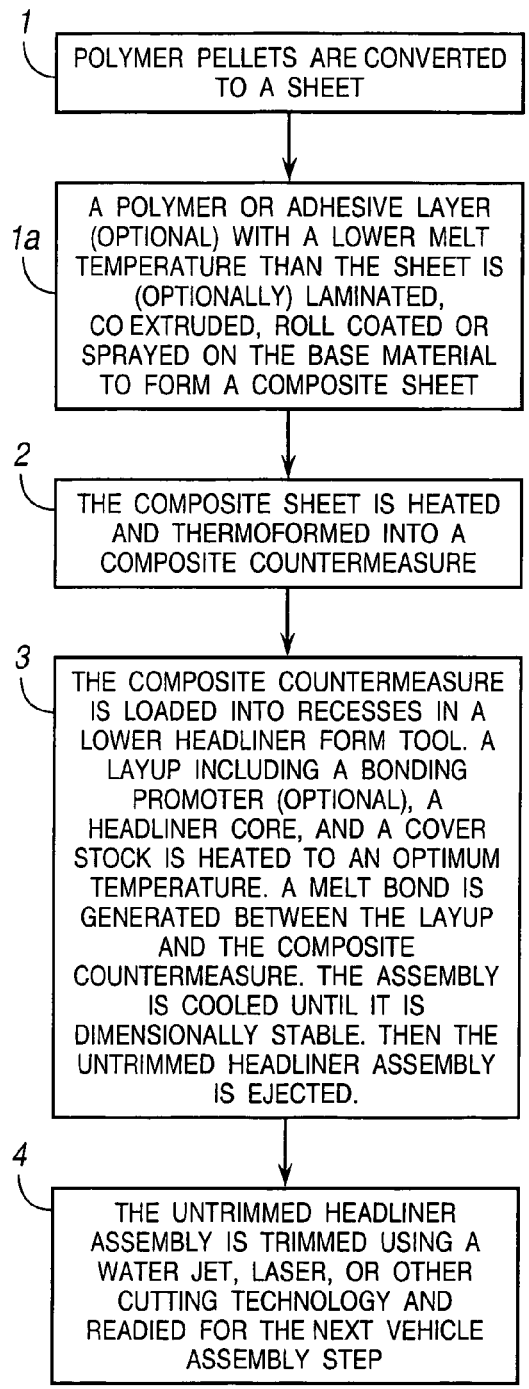

Reference is first made to FIG. 1. Steps 1-5 of the left hand column are the main steps involved in conventional ways to attach an energy-absorbing countermeasure to a headliner. In brief, those steps include:

1. A polymer, usually in pellet form, is converted to an extruded sheet.

2. The sheet is then heated and thermoformed into a countermeasure. If desired, the countermeasure can be shaped in three dimensions to conform to the environmental constraints into which the energy-absorbing countermeasure is to be installed. The thermoformed countermeasure is then trimmed, labeled, stacked, packaged and shipped to the headliner assembly plant.

3. A headliner is manufactured by any suitable process. Illustrative are those disclosed in U.S. Pat. Nos. 6,832,810; 6,582,639; 6,204,209; and 6,368,702. The disclosures of these U.S. patents are incorporated herein by reference. Suppliers of the headliner core include Azdel. The headliner is usually manufactured by combining a layup of the headliner core, a thin polymer means for adhering, and selected cover stock. The layup is heated, formed and cooled until it is dimensionally stable. Conventionally, the typical headliner includes a face fabric, an adhesive, a reinforcement fiber, and a composite of adhesives, foam, fiber, and scrim. Details of the headliner product are considered to be within the knowledge of those of ordinary skill in the art, and so are not replicated here.

4. The untrimmed headliner is then trimmed using a selection from several known processes: water jet, laser, or other cutting technology.

5. Conventionally, to secure the countermeasure to the headliner, a hot melt adhesive is supplied to one or both of the headliner or the countermeasure. The two parts are then brought into contact under pressure while the adhesive is active and is cured.

The right hand column of FIG. 1 describes the process steps that are involved in practicing the teachings of the present invention. Steps that correspond to those of the prior art have a common reference numeral. The main differences are that step (1A) is needed between steps 1 and 2; and a separate step 5 (gluing) is avoided because attachment occurs during the headliner forming step (in-molding). For ease of reference, the process steps 1-4 in FIG. 1 have the same numerals as the process steps set forth in claims 1-2.

The inventive process for attaching an energy-absorbing countermeasure to a headliner involves the following steps:

1. A sheet is prepared from which the energy-absorbing countermeasure is made.

Figure 2:
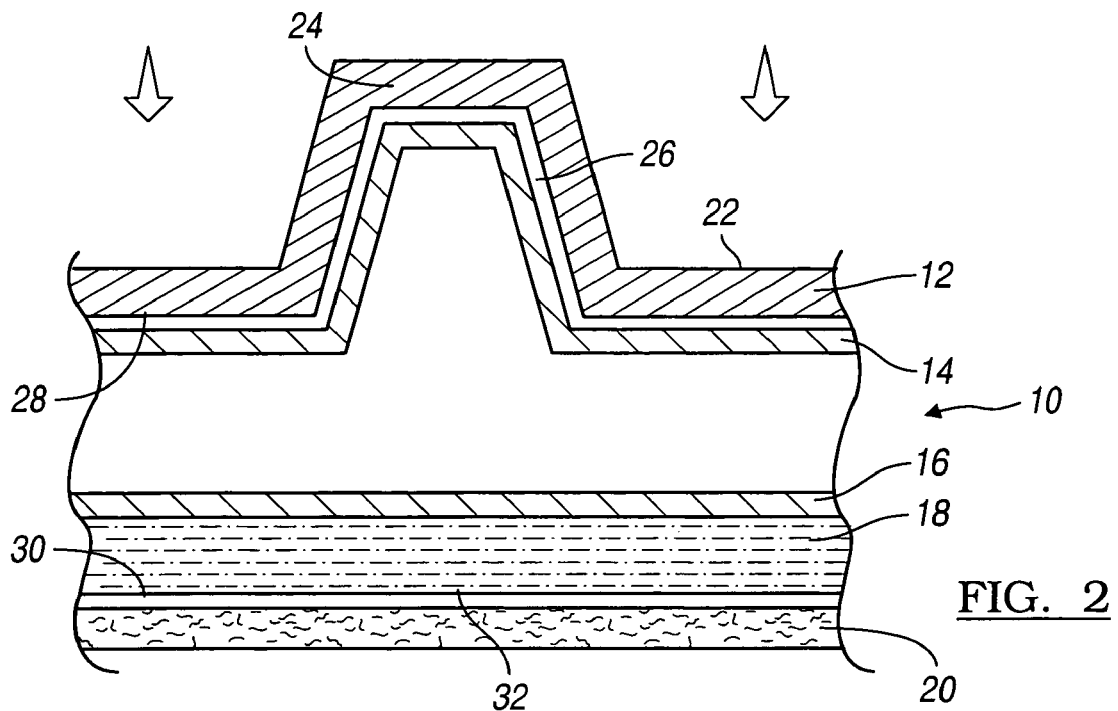
FIG. 2 is a cross sectional view of a portion of an intermediate assembly of an energy-absorbing countermeasure and a headliner before closure to form a final assembly.
Figure 3:
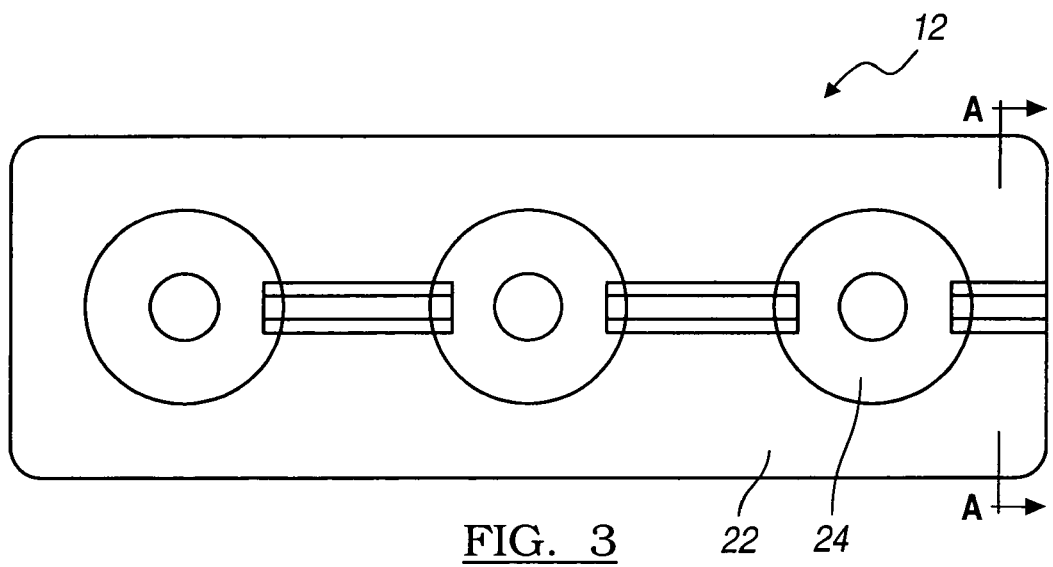
FIG. 3 is a cross-sectional view of a pressurized in-molding step.
Figure 3A:
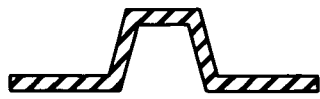

1A. Optionally, a means for adhering (if a film, preferably about 0.065" to 0.0015" thick) that has a lower melt temperature than the sheet is then affixed to the sheet (FIG. 2). The means for adhering include lamination, co-extrusion, roll coating, and spraying, for example. In this step, a composite sheet is formed, and may be coiled.

2. The composite sheet is then heated and thermoformed into a composite energy-absorbing countermeasure. In this step, the composite sheet is heated to an approximate temperature of 320° F.

3. The composite energy-absorbing countermeasure is then loaded into a headliner forming tool. A headliner layup—optionally including a bonding promoter (typically, a thin polymer film), a headliner core, and a cover stock—is heated to an optimum temperature (about 375° F.). It is then moved into contact with the composite energy-absorbing countermeasure by closing the form tool. A bond is formed between the heated "B" surface of the cover stock, the heated headliner core and the countermeasure when the assembly is subjected to pressure. As a result of this step, an untrimmed headliner assembly is prepared.

Conventionally, the "A" surface is the surface that is closest to a vehicle driver when sitting in the car. Thus, in step 3, the headliner layup is placed into a clamping frame so that its "A" surface is uppermost. A clamping force is then applied. Preferably, the force is applied parallel to two opposing longer edges for uniformity of pressure distribution. However, clamping force could also be applied to two opposing shorter edges, or variations thereof. The "A" surface is placed face up because most headliners are concave. During the heating step, the layup tends to sag under heat and gravity, thereby creating a naturally concave shape.

Unlike conventional approaches, no hot melt adhesive is needed in order to secure the energy-absorbing countermeasure to the headliner. As a result of the disclosed process steps, the energy-absorbing countermeasure is in-molded and is permanently attached to the headliner. Most, if not all, of the means for coordinating are in contact with the means for adhering. As a consequence, bonding forces between the countermeasure and the headliner are spread relatively uniformly across their entire interface, rather than being concentrated only in those regions in which (under prior art approaches) a glue has been applied.

The invention process thus avoids the conventional step (5) of applying a hot melt adhesive to the backside of the headliner core material. For efficiency, the time required in holding the two surfaces to be joined to allow curing in a subsequent assembly step is avoided. Further, the area of contact between the energy-absorbing structure and the headliner is extended.

In the heating cycle (step 3), the headliner layup is heated for about 45 to 75 seconds until the "B" surface (lower surface) of the headliner core reaches a temperature of approximately 375° F. The lower surface is exposed to more heat than the upper surface since the class A cloth surface is more sensitive to heat. The energy-absorbing countermeasure is supported and contacts the lower form tool primarily in the means for coordinating outside the energy-absorbing units. The layup is compressed and a bond is formed between the headliner layup and the energy-absorbing structure while the headliner is being made.

It will be appreciated that depending upon the shape of the male and female tool, the headliner to be shaped can assume various topographies: it could, for example, be crowned, if desired.

Another attribute of the invention is that it satisfies "pull" tests. One test of bonding between the materials revealed that a force of about 220 Newtons was required to separate first and second film layers. In contrast, one customer required that the layers withstand minimum separating forces up to about 50 Newtons.

It should also be realized that without regard to its method of application, included within the scope of the invention lies polymer films, and those made of polyvinyl chloride, thermoplastics, polyurethane, polyesters, polypropylene, polyethylene, polyolefins, polyvinyl acetal (EAA), ethylene/acrylic acid, and blends thereof.

In practice, a coating of a material such as Teflon® can be beneficially applied to either the headliner forming tool surface or the countermeasure tool forming surface or both to avoid unwanted adhesion.

The Assembly

FIG. 2 depicts the main components of the assembly of an energy-absorbing countermeasure and the headliner. Preferably, the energy-absorbing countermeasure 12 includes means (e.g., a base) for coordinating energy-absorbing units 24 (e.g., a cup-shaped recess). It will be appreciated that the form of the energy-absorbing countermeasure can be "customized" or "tuned" to produce predefined energy absorption characteristics within spatial constraints that may be imposed by a particular application.

As used herein, the energy-absorbing countermeasure 12 includes an assembly of recesses that are provided with means for coordinating the energy-absorbing units 22 therewithin. The means for coordinating 22 is terminated by a continuous periphery. Within the periphery, the means for a coordinating 22 may be planar, curved, or curvilinear. The coordinating means 22 may have a flat or curved topography with a variable number (n) of apertures, where n is an integer greater than or equal to zero. Thus, the means for coordinating 22 may alternatively include a base, web, a tether, a hinge, a planar or curved surface, and wings or combinations thereof that serve to position and support the energy-absorbing units 24 in relation to each other. One or more of the energy-absorbing units 24 are associated with the means for coordinating 22. Those means 22 coordinate the positioning of the energy-absorbing units 24 in relation to each other before, during, and after relative motion between an incident object and the energy-absorbing countermeasure.

At least some of the energy-absorbing units 24 have an interior wall surface 26. They cooperate to afford mutual support through the means for coordinating 22. The interior wall surface 26 is effectively a crushable member of an energy-absorbing unit 24. Either its upper or lower extremities can be presented to the headliner or the impacting force, but it is preferable that the lower extremity be presented to the headliner, as depicted in FIG. 2.

If desired, the interior wall surface 26 of an energy-absorbing unit 24 may be provided with a number (m) of breaches that are defined therewithin before impact, where m is an integer greater than or equal to zero. The breaches can be defined by slits (no material removed) or slots (material removed to form an opening), or both. Thus, within a given energy-absorbing countermeasure, the means for coordinating may or may not be flat, may or may not have a number (n) of apertures; one or more of the energy-absorbing units may be provided with a number (m) of breaches (e.g., slits or slots, or slits and slots, or neither slits nor slots); and the means for coordinating may be provided with a flat or curved topography.

If desired, at least some of the energy-absorbing units 24 may have a volcano or crater-shaped floor which may be domed, concave, or convex in order to impart particular energy-absorbing characteristics to an energy-absorbing unit.

U.S. patent application Ser. No. 11/014,418, filed on Dec. 16, 2004 (which is incorporated herein by reference) discloses that in a given application, a number of energy-absorbing countermeasures may be affixed to a substrate and that the substrate helps to position and configure the energy-absorbing countermeasures. One non-limiting example was disclosed: a vehicular headliner that extends across a "B" pillar. It will be appreciated however that the scope of the present invention is not limited to a specific position of the headliner in the vehicle, nor to the headliner itself as a substrate.

It is contemplated, for example, that the disclosed structure can be used in both head and side impact occupant protection applications. In either case, one or more energy-absorbing countermeasures may be mounted between the interior trim (headliner) and the body structure of an automobile (often where space is limited). Designs of specific forms of energy-absorbing countermeasure vary greatly when customizing them to fit and perform within a geometrical environment and constraints into which they are packaged. In decelerating an object that imparts the impacting force, impacting forces are at least partially absorbed by the energy-absorbing units and the headliner.

If desired, a first means for adhering 14 adheres to at least a part of the interior wall surface 26 and an underside 28 of the means for coordinating 22. Before closure of the forming tool, the headliner core 18 is positioned so that it is spaced apart from the underside 28 of the coordinating means 22. When used, a second means for adhering 16 extends over at least a portion of the top surface 30 of the headliner core 18 so that the second means for adhering 16 is separated from the first means for adhering 14. It will be appreciated that the use of an adhering means can be made either on the countermeasure, or the headliner layup, or on both surfaces.

A headliner cover stock 20 is affixed to at least a part of a second surface 32 of the headliner core 18. After the tool is closed, an assembly of the energy-absorbing countermeasure and a headliner is formed without an adhesive.

The energy-absorbing countermeasures are preferably made from polymers. Balancing cost, performance and formability, a selection of polypropylene (PP) and acrylonitirile butadenine styrene (ABS) material grade can be used. Specifically, these include Basell Polyolefins Pro-Fax SV152, polypropylene copolymer (SV152), BP Petro Chemicals polypropylene copolymer 3045, and General Electric Cycolac EX75 (EX75).

A particular energy-absorbing countermeasure may include a hinge section with leaves. Each leaf may extend from one of the energy-absorbing countermeasures so that they may be configured within the spatial constraints that are imposed by the environment at use.

If desired, an energy-absorbing countermeasure may be provided with cooperating means that may take the form of an adhesive, a clip, a vibration weld, a sonic weld, a heat stake, a "tongue-in-groove" arrangement, and the like—all serving the purpose of enabling the energy-absorbing countermeasure and headliner assembly to be attached to a vehicle structure or to enable an object to be attached to the assembly. Further, channels may be provided between energy-absorbing countermeasures to accommodate wiring, for example. Additionally, the channels may promote stiffness in one direction versus flexibility in another, if desired. Further, if desired, stiffening ribs can be provided between one or more energy-absorbing countermeasures to enhance the stiffness characteristic at selected locations.

This affords latitude to a designer who may wish to provide stiffness in one direction for impact resistance, yet flexibility in another direction to enable a given energy-absorbing module to bend or conform to the spatial constraints imposed by the environment in which the energy-absorbing countermeasure is to be installed.

For example, in certain environments a protrusion such as an HVAC duct, a coat hook, a sun visor, a wiring harness, or the head of a bolt may invade the space that would be occupied by a vehicle occupant. Ideally, it would be desirable to provide an energy-absorbing countermeasure having enhanced stiffness characteristics around such a protrusion. One way to provide such an absorber is to configure an energy-absorbing unit with an inner wall that may be configured or "tuned" independently of the energy-absorbing characteristics of the outer wall surface. In this way, a floor at the foot of an inner wall (in a volcano structure, for example) may effectively bottom out during energy-absorption so that the amount of resistance to greater deflection is more than the resistance offered before bottoming out.

Another advantage of the disclosed invention is that various energy-absorbing characteristics can be imparted to specific locations within a vehicle while avoiding a "bleed through" of the energy-absorbing countermeasure to the class A surface, the appearance of which is important to the vehicle buyer or owner.

Figure 4:
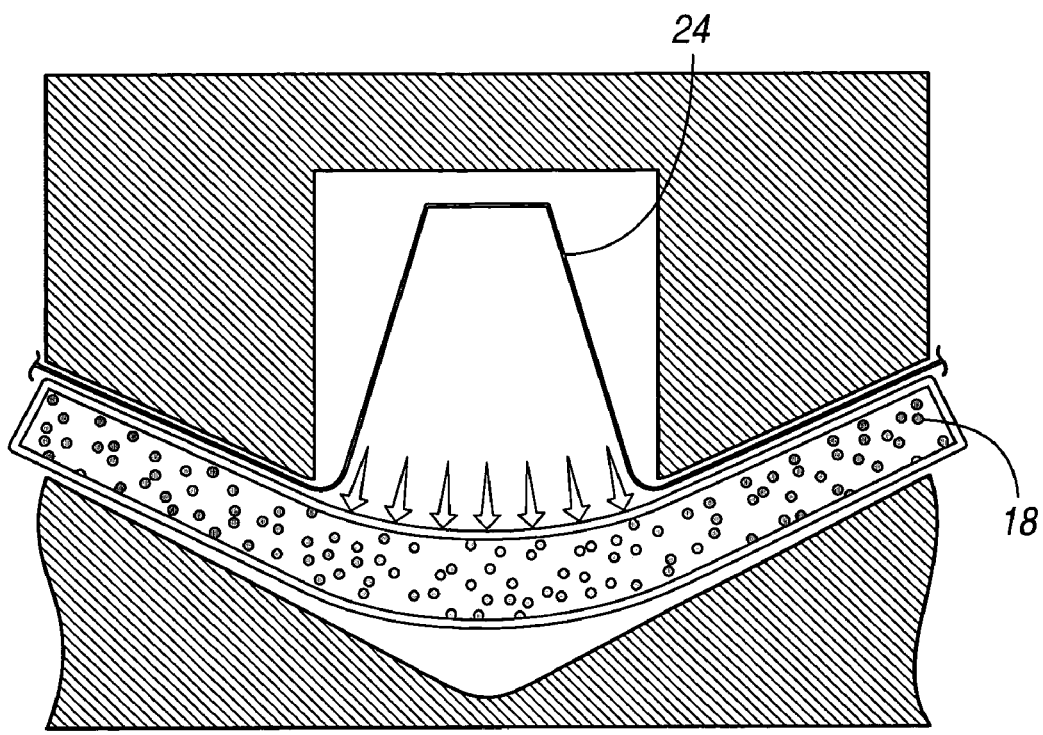
FIG. 4 is a cross-sectional view of an energy-absorbing countermeasure in an intermediate manufacturing process stage.
Figure 5:
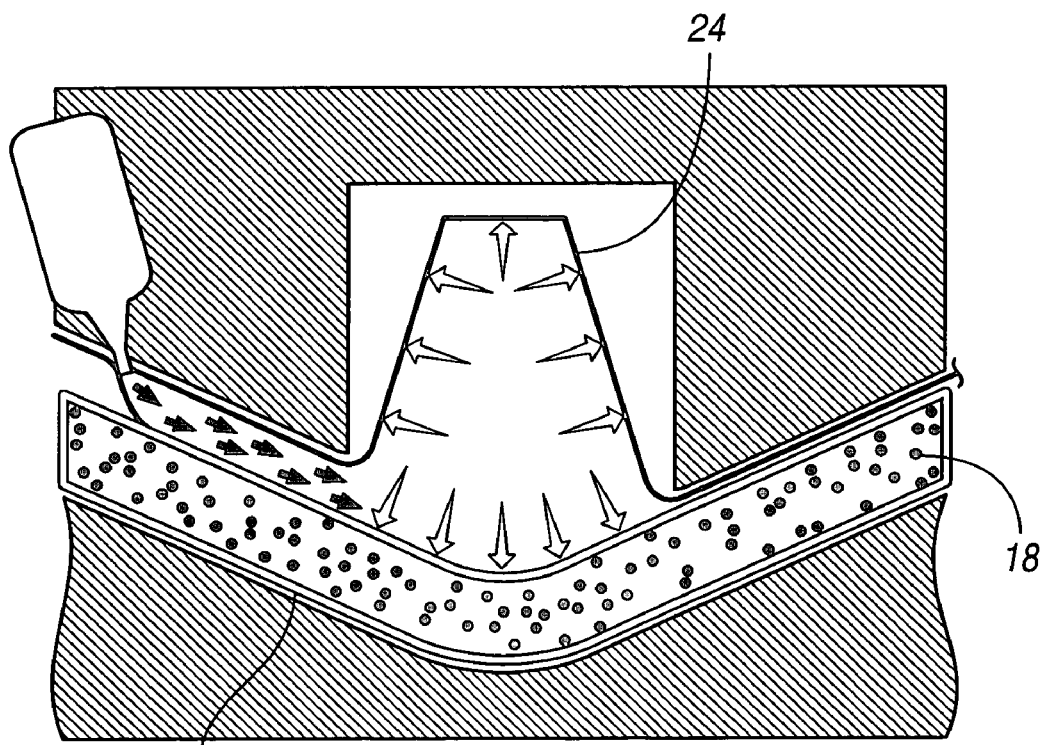
FIG. 5 depicts the results of applying a source of fluid pressure from within an energy-absorbing unit so that the headliner layup conforms to an upper headliner forming tool.

In certain instances, there may be large recesses on a contoured headliner surface that may be wholly or partially covered by an energy-absorbing countermeasure. In such situations, the addition of air pressure within the energy-absorbing units may be usefully deployed to urge the headliner material to the "A" surface to prevent bleedthrough. FIGS. 4 and 5 depict the situation.

Upon tool closing, a seal is made between the means for coordinating and the backside of the headliner core. A separate nozzle with a flexible gasket provides a seal at the pressure inlet.

Air pressure is applied while the form tool is closed. The resulting pressure generated in the recess/rib cavity forces the layup to the headliner form tool A surface.

In FIG. 4, there is a void to be filled between the upper headliner forming tool and the headliner layup. Pressure is needed inside the energy-absorbing unit to urge the layup to conform to the "A" surface and to the forming tool.

FIG. 5 shows the results. In FIG. 5, the headliner layup and its cover conform to the headliner forming tool "A"-surface. This is achieved by the application of fluid (e.g., air) pressure from a source that is directed through one or more ribs that communicate to at least some of the energy-absorbing units.

It will be appreciated that the invention is not limited to the preferred embodiment (discussed earlier) of energy-absorbing countermeasure. Rather, this term is meant to embrace other forms of energy-absorbing countermeasure, such as injection molded rib cartridges, and foam countermeasures.

Thus, the disclosed process involves making an energy-absorbing countermeasure and making a headliner layup while integrally molding in the previously made countermeasure.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An assembly of an energy-absorbing countermeasure and a headliner, comprising:
   a thermoformed energy-absorbing countermeasure including means for coordinating energy absorbing units, one or more energy-absorbing units associated with the means for coordinating, the means for coordinating positioning the one or more units in relation to each other before, during and after impact between an incident object and the energy-absorbing countermeasure, at least some of the units including an interior wall surface,
   first means for adhering that adheres to at least a part of an underside of the energy-absorbing countermeasure;
   second means for adhering that extends over at least a portion of the top surface of a headliner core and the energy-absorbing countermeasure;
   a headliner core positioned so that it lies in mating proximity with the second means for adhering; and
   a headliner cover stock that is affixed to at least a part of the bottom surface of the headliner core.

2. The assembly of claim 1, wherein the first means for adhering comprises a polymer means for adhering.

3. The assembly of claim 1, wherein the second means for adhering comprises a polymer means for adhering.

4. The assembly of claim 1, wherein the energy-absorbing countermeasures include one or more ducts that can be communicated to a source of fluid pressure, the one or more ducts also communicating with one or more energy-absorbing units so that pressure can be applied to the headliner layup to enable the headliner layup to conform with contours defined by a headliner forming tool.

5. The assembly of claim 1 wherein at least some of the units include an intermediate wall, the intermediate wall defining a number (m) of breaches, where m is greater than or equal to zero.

6. An assembly of an energy-absorbing countermeasure and a headliner, comprising:
   a thermoformed energy-absorbing countermeasure;
   a headliner core and a headliner cover stock that is affixed to at least a part of a bottom surface of the headliner core; and
   means for adhering that is placed between an upper surface of the headliner core and a lower surface of the energy-absorbing countermeasure wherein the energy-absorbing countermeasure and the headliner layup are united by a melt bond formed by the means for adhering under the influence of heat and pressure so that the energy-absorbing countermeasure becomes in-molded in relation to the headliner.

* * * * *